Inventors
A. R. Dawson
R. V. Todd

Dec. 15, 1964   A. R. DAWSON ETAL   3,161,231
COLLAPSIBLE SHELTERS
Filed Jan. 24, 1963   8 Sheets-Sheet 3

Inventors
A. R. Dawson
R. V. Todd
By
Attorneys

Dec. 15, 1964    A. R. DAWSON ETAL    3,161,231
COLLAPSIBLE SHELTERS

Filed Jan. 24, 1963    8 Sheets-Sheet 5

Inventors
A. R. Dawson
R. V. Todd
By
Holcomb, Wetherill & Brisebois
Attorneys

Dec. 15, 1964  A. R. DAWSON ETAL  3,161,231
COLLAPSIBLE SHELTERS

Filed Jan. 24, 1963  8 Sheets-Sheet 6

Inventors
A. R. Dawson
R. V. Todd
By
Holcomb Wetherill & Brisbois
Attorneys

United States Patent Office 3,161,231
Patented Dec. 15, 1964

3,161,231
COLLAPSIBLE SHELTERS
Arnold Richard Dawson, 13 Lywood Drive, Worcester Park, Surrey, England, and Ramsay Vickers Todd, 40 Crescent Road, Burgess Hill, Sussex, England
Filed Jan. 24, 1963, Ser. No. 253,660
Claims priority, application Great Britain, Mar. 26, 1962, 11,457/62; Apr. 2, 1962, 12,583/62
6 Claims. (Cl. 160—132)

The present invention relates to collapsible shelters adapted to be fixed to a vertical surface such as a wall, in order to serve as a collapsible garage or for other purposes.

Our United States patent application Serial No. 87,806, filed February 8, 1961, and now abandoned, discloses a collapsible shelter comprising a collapsible framework in the form of a plurality of inverted generally U-form frame members which have their lower ends pivotable at each end about a common axis or separate axes and means for securing one of the frame members to a wall or to the like with the pivot axis or axes adjacent the wall and extending parallel thereto, so that when the shelter is collapsed all of the frame members are located close to each other and to the wall in a substantially vertical position and when the shelter is erected or extended the frame members pivot about the axis or axes to spaced positions in which the frames are disposed in a general fanwise array, a flexible covering material being arranged over and secured to the framework. Means are also provided for counterbalancing the weight of the shelter in order to assist in erecting and collapsing the shelter with the exertion of only small manual effort.

It is an object of the present invention to provide improved and alternative means for counterbalancing the weight of the shelter.

According to the present invention, counterbalancing of the shelter is achieved by means of spring members arranged so as to act between at least some of the frame members of the shelter and which are loaded as the shelter is moved to its erected or extended position whereby the force exerted by the spring members tends to assist the restoration of the frame members to the collapsed position. Preferably a plurality of spring members are arranged at each end of the frame members. The spring members at each end of the frame members may be connected between adjacent frame members of the shelter, and spring members may be arranged between successive adjacent frame members or only between some of the frame members.

According to a feature of the invention, spring forces of different power are arranged between different ones of the frame members. Thus more powerful spring forces are arranged between those frames adjacent or near to the wall when the shelter is in the collapsed position, whilst less powerful spring forces can be provided between the frames which are further away from the wall, since the restoring force required on these latter frames is not so great as that required on the former frames. The varying spring forces can be obtained either by using different sizes of springs or by using additional springs in positions where a greater spring force is required.

According to one form of the invention one or more coil springs are arranged between successive frames at each end of the shelter, the ends of the springs being anchored to brackets projecting from the frames. Springs of different power may be provided between different frames. The brackets may be positioned so that the springs are arranged in staggered relationship in order to facilitate their accommodation in the limited space available between adjacent frames when they are in the collapsed position.

According to another form of the invention, one or more coil springs are arranged between successive frames at each end of the shelter, the coil springs being of somewhat similar shape to clothes-peg springs and having projecting arms which engage with studs or the like projecting from the frames. The coil springs may all be of similar power but different numbers thereof may be arranged in banks on the studs according to the spring power which it is desired to provide between any two adjacent frames.

According to a further form of the invention, spring means are accommodated within the end portions of at least some of the frame members and anchored at one end relative to the associated frame member and connected at their other end to an anchoring point on another frame member, whereby as the frames move apart during the erection of the shelter the spring means are loaded so that the forces exerted by the spring means tend to assist the restoration of the frame members to the collapsed position. Preferably a plurality of spring means are arranged at each end of the shelter.

Thus, coil springs may be located in tubular portions at each end of at least some of the frame members and the lower end of each coil spring is anchored relative to the associated frame member, whilst its upper end is connected to a flexible wire or cable which passes out through the wall of the frame member and is anchored to a point on the next adjacent frame member. In order to guide and ensure the free running of the wires or cables, they preferably pass over a pulley arranged adjacent the point where they emerge through the wall of the frame members.

Advantageously springs may be provided in tubular portions at each end of all of the frame members except that frame member which lies closest to the ground when the shelter is in its erected position.

Springs of different power may be provided in different ones of the frame members. Thus more powerful springs are provided in those frames adjacent or near to the wall when the shelter is in the collapsed position whilst less powerful springs are provided in the frames which are further away from the wall, since the restoring force required on these latter frames is not so great as that required on the former frames.

In order that the invention may be more fully understood, reference will now be made to the accompanying drawings, in which.

Figure 1:
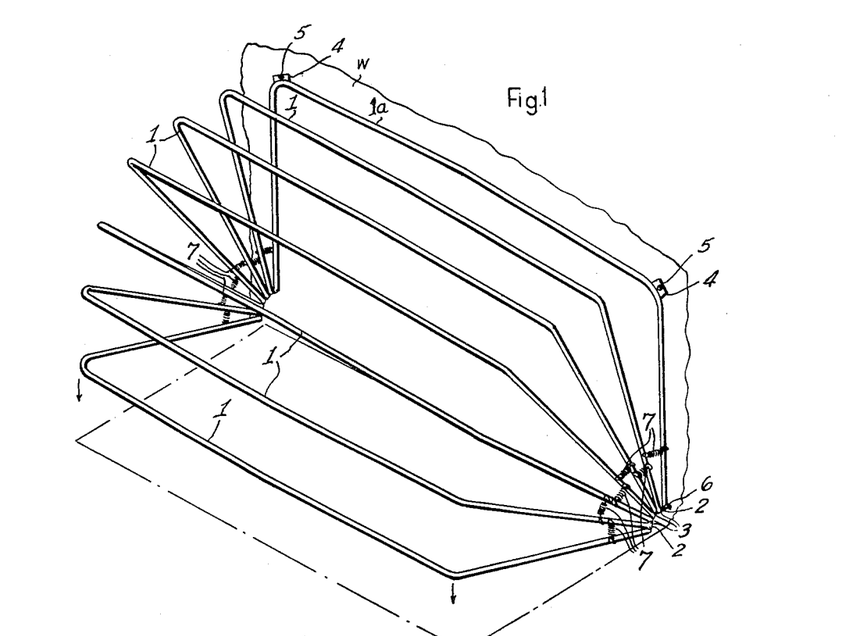
FIGURE 1 is a perspective view of one form of collapsible shelter according to this invention, showing the shelter fastened to a wall and in the almost extended position.
Figure 2:
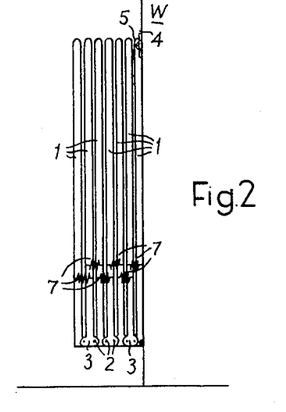
FIGURE 2 is a side elevation of the shelter of FIGURE 1 in the collapsed position.
Figure 3:
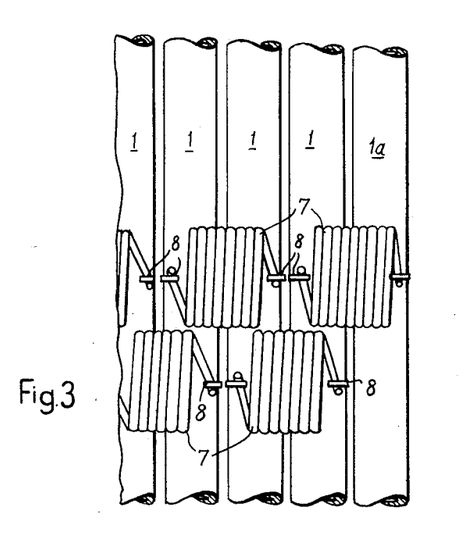
FIGURE 3 is a fragmentary view on a larger scale of the arrangement of springs employed in FIGURES 1 and 2, showing the frames in the collapsed position.
Figure 4:
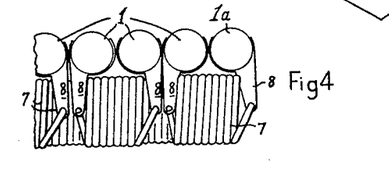
FIGURE 4 is a plan view of FIGURE 3.

Referring to FIGURES 1 to 5 of the drawings, the collapsible shelter comprises a plurality of tubular metal frame members 1 of inverted U-form, which are pivotally supported at their opposite ends, so that the frames can move between the extended position shown in FIGURE 1 and the collapsed position shown in FIGURE 2. The frame 1a nearest the wall W is attached to the wall in a vertical position by means of brackets or plates 4 through which extend wall bolts or plugs 5. The frame members are preferably made of metal of tubular cross section, but may be made of other materials, such as wood, and have other cross sections. The frame is covered with flexible waterproof covering material which is secured thereto in any suitable manner, for example a flexible plastic material or canvas, which is not shown for the sake of clarity. The plastic material may be opaque or transparent. At each end of the shelter the lower ends of the frame members are provided with or formed as hinge plates 3 which are pivotally connected together by means of nuts and bolts 2 extending through apertures in the plates. The hinge plate 3 at each end of the frame 1a adjacent the wall is also provided with an apertured bracket 6 by means of which it can be secured to the wall with the aid of wall plugs or bolts.

In order to assist in counterbalancing the weight of the shelter and to restore it from an extended position to a collapsed position, a plurality of coil springs 7 are arranged at each end of the shelter between the successive frames, these springs being stretched or loaded as the shelter moves from its collapsed position to its extended position. As shown more clearly in FIGURES 3 and 4, these coil springs are attached between brackets 8 extending outwardly from the frames. The brackets are so positioned that successive springs are arranged in staggered relationship, in order to facilitate their accommodation between the frame members when the shelter is collapsed. Some of the springs can be made to be of different power to others, the more powerful springs being provided on the frames nearest to the wall which have to exert the most force during the collapsing of the shelter. If desired the springs can be arranged on both sides of the frame members. If desired, at least some of the brackets 8 can be cranked so as to accommodate larger springs having a greater power.

Figures 5, 6:
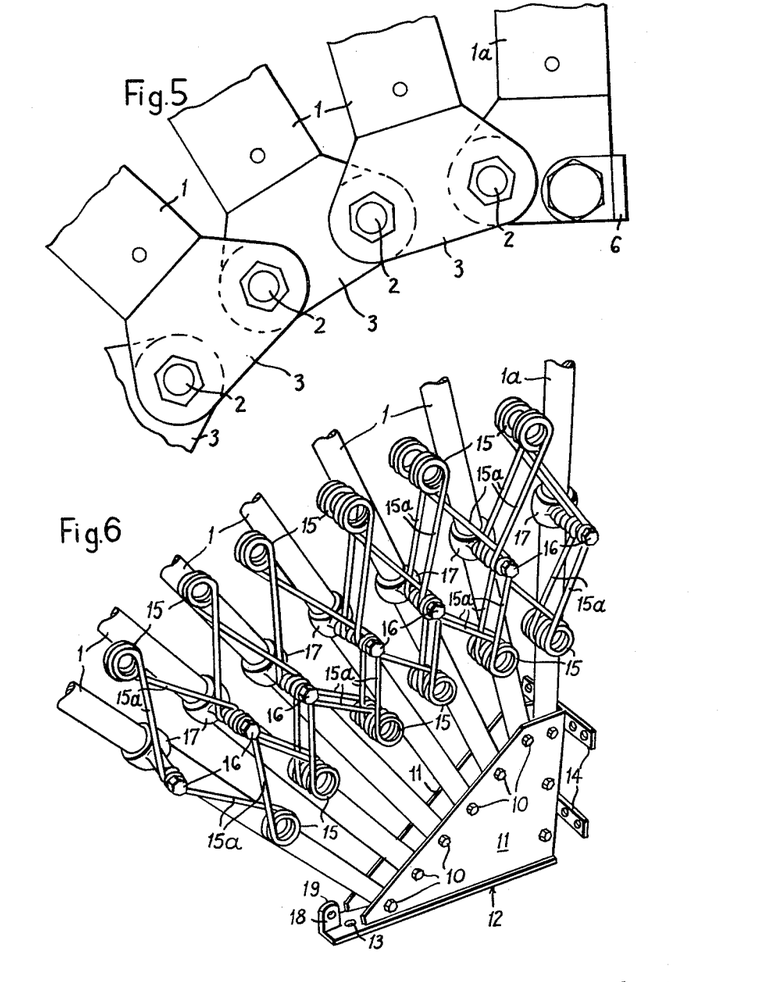
FIGURE 5 is a fragmentary view, again on a larger scale, of part of the pivoting arrangement for the frames.
FIGURE 6 shows a further spring arrangement according to this invention, and also a further pivoting arrangement for the frames.

FIGURE 6 is a perspective view of an alternative arrangement according to this invention, only the lower portion of the frames at one end of the shelter being shown. In this embodiment the ends of the frames are pivotally mounted about separate rivets or bolts 10 extending between the side walls 11 of a shoe member 12. This latter member is provided with an aperture 13 through which can pass a bolt or plug to attach the shoe member to the ground and also brackets 14 by means of which it can be attached to the wall against which the shelter is to be erected. In this embodiment the springs 15 are somewhat similar to clothes-peg springs and have arms 15a which engage around studs 16 carried by collars 17 attached to the frame members. The collars may be adjustable in height. Springs 15 may be arranged both above and below the studs, as shown, or only on one side of the studs. Moreover different numbers of springs may be provided on different ones of the studs, as is also shown, according to the springing power which is required between adjacent frame members. If desired springs may be arranged on both sides of the frame members. It will be apparent that the springs are loaded as the shelter is moved to its extended position and the frame members move apart. FIGURE 6 shows the frame members in a partially extended position of the shelter.

The shoe member 12 is also provided with an upstanding lug 18 having a hole 19 through which a pin may be passed to hold the lowermost frame member adjacent the ground when the shelter is in the extended position. Alternatively a padlock may be passed through this lug at one or both ends to lock the shelter when in the erected position.

Referring now to FIGURES 7 to 10 of the drawings, the framework of the collapsible shelter is again constructed generally as described with reference to FIGURES 1 to 5 and comprises a plurality of tubular metal frame members 1 of inverted U-form which are pivotally supported at their opposite ends so that the frames can move between the extended position shown in FIGURE 1 and the collapsed position shown in FIGURE 2. The frame 1a nearest the wall W is attached to the wall in a vertical position by means of brackets or plates 4 through which extend wall bolts or plugs 5. The frame is covered with a flexible waterproof covering material, for example plastic material, which is not shown for the sake of clarity. At each end of the shelter the lower ends of the frame members are provided with or formed as hinge plates 3, which are pivotally connected together by means of nuts and bolts 2, extending through apertures in the plates. The hinge 3 at each end of the frame 1a adjacent the wall is also provided with an apertured bracket 6 by means of which it can be secured to the wall with the aid of wall plugs or bolts.

In order to assist in counterbalancing the weight of the shelter and to restore it from the extended position to a collapsed position, a coil spring 27 is arranged within the tubular portion at each end of each of the frame members, except for the outer frame member which is adapted to lie adjacent the ground when the shelter is in the extended position. As shown more clearly in FIGURES 9 and 10, the lower end of each spring is anchored to a lug 28 within the lower end of the associated frame member whilst the upper end of each spring is attached to a flexible wire 29 which passes out through an aperture 30 in the wall of the frame member and over a guide pulley 31 secured to the frame member. The other end of the wire 29 is anchored to the next adjacent frame member, for example by securing it at 33 to the housing 32 of the pulley on the next adjacent frame member. With this arrangement it will be seen that as the shelter is moved from its collapsed position to its extended position and the frames move apart from each other, the flexible wires 29 will pull the springs 27 so causing the springs to exert a force which tends to counterbalance the weight of the shelter and restore it to its collapsed position. The springs within the frames adjacent or near to the wall may be made more powerful than the springs in the frame further from the wall, which do not have to exert so much force during the collapsing of the shelter. The variations in power of the springs may be achieved by making the springs which are desired to be more powerful of greater length. Instead of employing coil springs as shown, the spring means may comprise a plurality of strands of stout elastic cord or shock cord.

Figure 11:
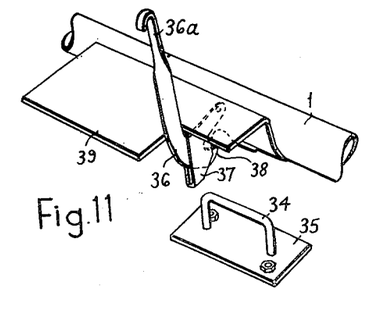
FIGURE 11 is a perspective view of a catch assembly for retaining the shelter in its erected position.

FIGURE 11 is a perspective view of a catch arrangement carried by the frame member which lies adjacent the ground and which may be employed to anchor the shelter to the ground in the extended position, besides facilitating the raising of the shelter when it is desired to move it to the collapsed position. The catch comprises a stirrup member 34 mounted on a plate 35 which is adapted to be secured to the ground and a pivotable lever 36 carried by a bracket 37 having a nose portion 38 which can engage in the stirrup 34 to hold the shelter in the erected position. The bracket 37 is attached to a footplate 39 carried from the lowermost frame member 1. Foot pressure can be applied to the footplate 39 to assist in lowering the frame member 1 of the shelter nearest the ground when the shelter is being extended. When it is desired to collapse the shelter the handle 36a of the lever is raised so that the lever pivots to release the nose from behind the stirrup.

Figures 7, 12:
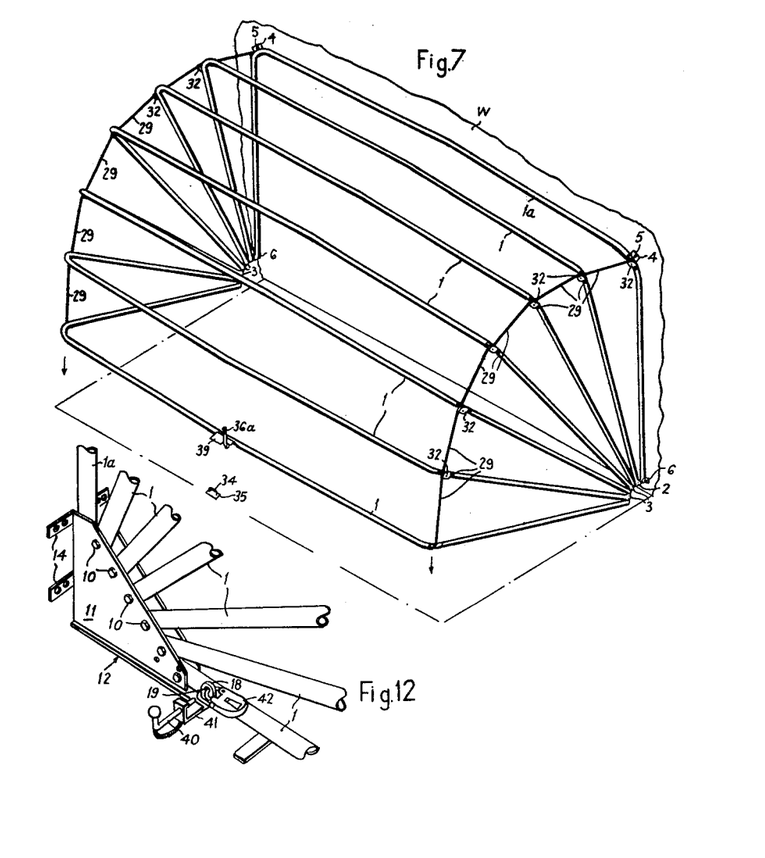
FIGURE 7 is a perspective view of another form of collapsible shelter according to this invention, showing the shelter fastened to a wall and the almost extended position.
FIGURE 12 shows a further pivoting and locking arrangement for the frames.
Figure 8:
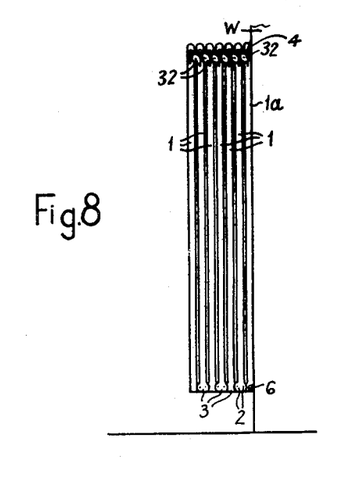
FIGURE 8 is a side elevation of the shelter of FIGURE 7 in the collapsed position.
Figure 9:
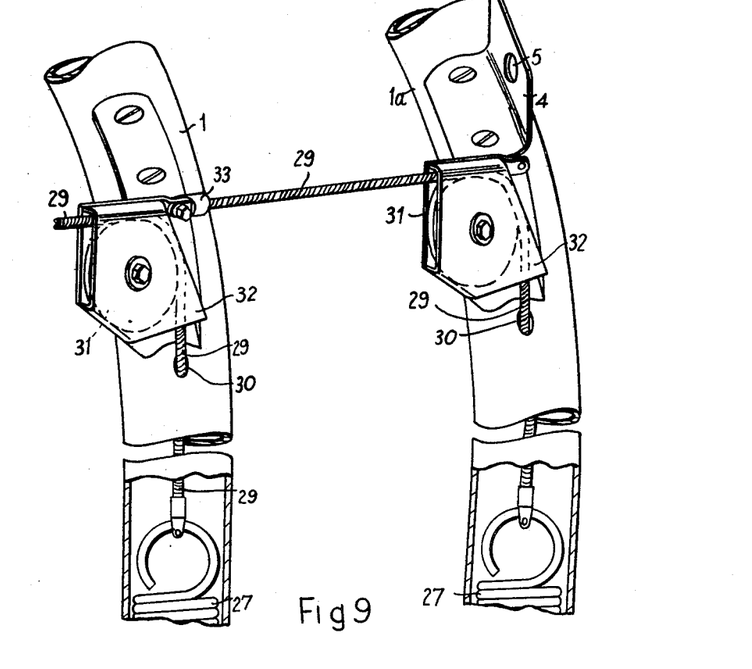
FIGURE 9 is a fragmentary view on a larger scale of two adjacent frames showing the arrangement of the flexible wires and cables.
Figure 10:
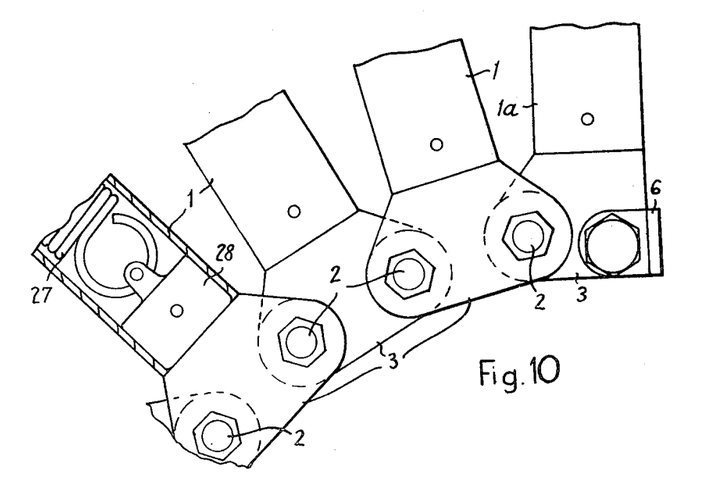
FIGURE 10 is a fragmentary view, again on a larger scale, of part of the pivoting arrangement for the frames.

FIGURE 12 is a perspective view of a further pivoting arrangement for the frames which is basically similar to that in FIGURE 6, only the lower portion of the frames at one end of the shelter being shown. In this embodiment, the ends of the frames are again pivotally mounted about separate rivets or bolts 10 extending between the side walls 11 of a shoe member 12. This latter member is provided with an aperture (not shown) through which can pass a bolt or plug to attach the shoe member to the ground, as well as with brackets 14 by means of which the shoe member can be attached to the wall against which the shelter is to be extended. Moreover the shoe member is provided with an upstanding lug 18 having a hole 19 through which a pin 40 carried by the bracket 41 may be passed to hold the lowermost frame member adjacent the ground when the shelter is in the extended position. Alternatively a padlock 42 may be passed through the lug 18 at one or both ends of the shelter to lock the shelter when in the extended position.

Figures 13, 15:
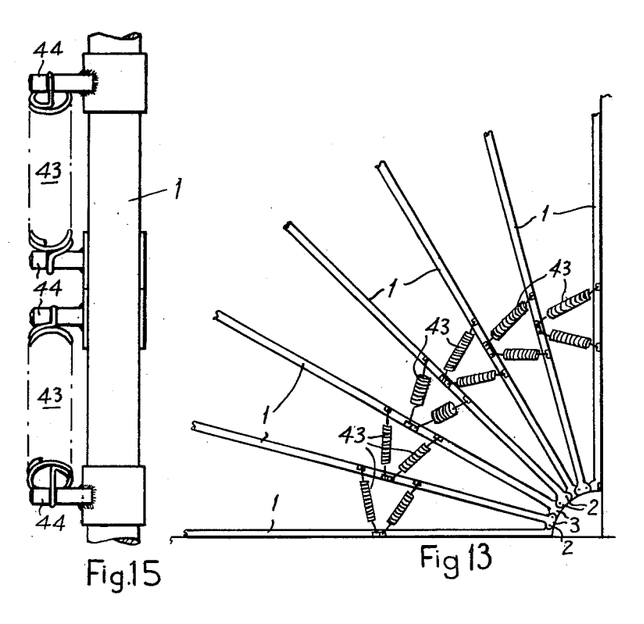
FIGURE 13 is a side view of part of a further embodiment of shelter incorporating another springing arrangement and shown in the extended position.
FIGURE 15 is an end view of the arrangement of FIGURE 14.
Figure 14:
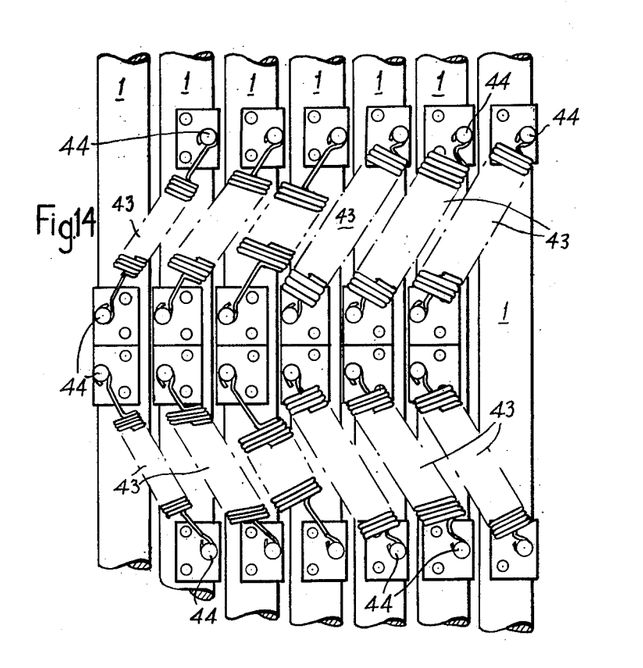
FIGURE 14 is a fragmentary view on a larger scale of the arrangement of springs shown in FIGURE 13, showing the frames in the collapsed position.

FIGURES 13 to 15 show a further embodiment of springing arrangement wherein two springs 43 are arranged between successive frames at each end of the shelter and are inclined in opposite directions to form a V. The various pairs of inclined springs are of different sizes and hence different powers, as can be seen in FIGURE 14, the more powerful springs being arranged between those frames adjacent or near to the supporting wall W. The ends of the springs 43 are anchored to lugs 44 secured to the frames 1.

As can be seen from FIGURE 14, the plurality of springs 43 between the various successive frames 1 form a herring bone or chevron array of springs across the ends of the frames. The lower ends of the frames are pivotally interconnected together in the manner shown in FIGURE 5.

In all of the embodiments described the power of the springs is preferably chosen so as just to counterbalance the weight of the shelter and so that it can be lifted from the extended position to the collapsed position with a very small manual effort.

The frames forming the shelter may each consist of several parts connected or interfitted together, for example a central or horizontally extending part and two end parts. The end parts may each comprise separate interfitting portions, e.g. an upper portion connected to the central part and a lower portion which carries the attachments for the springing arrangement. The various portions are joined together in any suitable manner, for example by welding, brazing, bolts or rivets.

Whilst particular embodiments have been described it will be understood that various modifications may be made without departing from the scope of this invention. Thus although in the embodiments described the shelter is shown as comprising seven frame members, a larger or smaller number of frame members may be employed according to the size of the shelter. Moreover the spring arrangements shown in the embodiments of FIGURES 1 to 5 and 7 to 10 may obviously be incorporated with the pivoting arrangements shown in FIGURES 6 and 12 and the springing arrangement shown in FIGURE 6 may be incorporated with the pivoting arrangement of FIGURES 1 to 5 and 7 to 10.

According to a further modification of the embodiment of FIGURES 1 to 5, the springs such as 7 arranged between successive frames at each end of the shelter are inclined with respect to the frames so that a greater length of spring can be accommodated between any two frames.

We claim:

1. A collapsible shelter comprising a collapsible framework in the form of a plurality of inverted generally U-form frame members which have their lower ends pivotable at each end about pivot means, and means for securing one of the frame members to a wall with the pivot means adjacent the wall and so that when the shelter is collapsed all of the frame members are located close to each other and to the wall in a substantially vertical position and when the shelter is extended the frame members pivot about the pivot means to spaced positions in which the frames are disposed in a generally fanwise array, and a flexible covering material arranged over and secured to the framework, wherein means are provided for counterbalancing the weight of the shelter, said counterbalancing means comprising a plurality of spring members of different powers arranged at each end of the shelter and respectively connected between different ones of the frame members of the shelter with the more powerful spring members connected to the frame members which are to be closest to said wall, and said spring members being loaded as the shelter is moved to its extended position whereby the force exerted by the spring members tends to assist the restoration of the frame members to the collapsed position.

2. A collapsible shelter as claimed in claim 1, wherein at least one coil spring is arranged between successive adjacent frame members at each end of the shelter, the ends of the springs being anchored to brackets projecting from the frame members and in which the brackets are positioned so that the springs are arranged in staggered relationship in order to facilitate their accommodation in the limited space available between successive adjacent frame members when they are in the collapsed position.

3. A collapsible shelter as claimed in claim 1, wherein at least one coil spring is arranged between successive adjacent frame members at each end of the shelter and said springs are inclined with respect to the frame members so that a greater length of spring can be accommodated between any two frame members.

4. A collapsible shelter comprising a collapsible framework in the form of a plurality of inverted generally U-form frame members which have their lower ends pivotable at each end about pivot means, and means for securing one of the frame members to a wall with the pivot means adjacent the wall and so that when the shelter is collapsed all of the frame members are located close to each other and to the wall in a substantially vertical position and when the shelter is extended the frame members pivot about the pivot means to spaced positions in which the frames are disposed in a generally fanwise array, and a flexible covering material arranged over and secured to the framework, wherein means are provided for counterbalancing the weight of the shelter, said counterbalancing means comprising pairs of springs arranged between at least some of the adjacent frame members at each end of the shelter, at least some of the pairs of springs at each end of the shelter being of different power to others of said pairs of springs with the more powerful pairs of springs connected to the frame members which are to be closest to said wall and the two springs of each pair being inclined in opposite directions to form a V, whereby the series of pairs of springs between the various frame members at each end of the frame members form a chevron array of springs across the ends of the frame members, and said springs being loaded as the shelter is moved to its extended position whereby the force exerted by the springs tends to assist the restoration of the frame members to the collapsed position.

5. A collapsible shelter comprising a collapsible framework in the form of a plurality of inverted generally U-form frame members which have their lower ends pivotable at each end about pivot means and means for securing one of the frame members to a wall with the pivot means adjacent the wall and so that when the shelter is collapsed all of the frame members are located close to each other and to the wall in a substantially vertical position and when the shelter is extended the frame members pivot about the axis or axes to spaced positions in which the frames are disposed in a generally fanwise array, and a flexible covering material arranged over and secured to the framework, wherein means are provided for counterbalancing the weight of the shelter, said counterbalancing means comprising spring members arranged at each end of the shelter and connected so as to act with different powers between at least some of the frame members of the shelter with the more powerful spring members connected to the frame members which are to be closest to said wall, and said spring members being loaded as the shelter is moved to its extended position whereby the force exerted by the spring members tends to assist the restoration of the frame members to the collapsed position and said spring members are coil springs of a similar shape to clothes-peg springs and have projecting arms which engage with studs projecting from the frame members.

6. A collapsible shelter comprising a collapsible framework in the form of a plurality of inverted generally U-form frame members which have their lower ends pivotable at each end about pivot means and means for securing one of the frame members to a wall with the pivot means adjacent the wall and so that when the shelter is collapsed all of the frame members are located close to each other and to the wall in a substantially vertical position and when the shelter is extended the frame members pivot about the axis or axes to spaced positions in which the frames are disposed in a generally fanwise array, and a flexible covering material arranged over and secured to the framework, wherein means are provided for counterbalancing the weight of the shelter, said counterbalancing means comprising spring means accommodated within the end portions of at least some of the frame members and which are anchored at one end relative to the associated frame member and connected at their other end to an anchoring point on another frame member, at least some of said spring means at each end of the shelter being of different power to others of said spring means and the more powerful spring means being located in the frame members which are to be closest to said wall, whereby as the frame members move apart during the extension of the shelter the spring means are loaded so that the forces exerted by the spring means tend to assist the restoration of the frame members to the collapsed position.

References Cited in the file of this patent
UNITED STATES PATENTS

| | | |
|---|---|---|
| 2,126,293 | Thompson | Aug. 9, 1938 |
| 2,282,914 | Vetterlein | May 12, 1942 |
| 2,538,286 | Todd | Jan. 16, 1951 |
| 2,581,827 | Zveibil | Jan. 8, 1952 |
| 2,627,913 | Hill | Feb. 10, 1953 |
| 2,856,996 | Gamacme | Oct. 21, 1958 |
| 3,047,059 | Trinchero | July 31, 1962 |
| 3,074,079 | Isaacson | Jan. 22, 1963 |

FOREIGN PATENTS

| | | |
|---|---|---|
| 299,110 | Great Britain | Oct. 25, 1928 |